United States Patent
Lefebvre et al.

(10) Patent No.: US 12,197,266 B2
(45) Date of Patent: Jan. 14, 2025

(54) DYNAMIC POWER ALLOCATION FOR MEMORY USING MULTIPLE INTERLEAVING PATTERNS

(71) Applicant: GoPro, Inc., San Mateo, CA (US)

(72) Inventors: Alexis Lefebvre, Paris (FR); Vincent Vacquerie, Longnes (FR)

(73) Assignee: GoPro, Inc., San Mateo, CA (US)

( * ) Notice: Subject to any disclaimer, the term of this patent is extended or adjusted under 35 U.S.C. 154(b) by 24 days.

(21) Appl. No.: 17/992,406

(22) Filed: Nov. 22, 2022

(65) Prior Publication Data

US 2024/0168535 A1 May 23, 2024

(51) Int. Cl.
| | |
|---|---|
| G06F 1/00 | (2006.01) |
| G06F 1/10 | (2006.01) |
| G06F 1/3225 | (2019.01) |
| G06F 1/3296 | (2019.01) |
| G06F 1/3203 | (2019.01) |

(52) U.S. Cl.
CPC .............. *G06F 1/3225* (2013.01); *G06F 1/10* (2013.01); *G06F 1/3296* (2013.01); *G06F 1/3203* (2013.01)

(58) Field of Classification Search
CPC ......... G06F 1/3225; G06F 1/10; G06F 1/3296
USPC ....................................................... 713/320
See application file for complete search history.

(56) References Cited

U.S. PATENT DOCUMENTS

| | | | | |
|---|---|---|---|---|
| 8,072,463 B1* | 12/2011 | Van Dyke | ........... | G06F 12/0607 345/568 |
| 11,386,012 B1* | 7/2022 | Krishnaswamy | ..... | G06F 12/109 |
| 11,886,340 B1* | 1/2024 | Tong | ..................... | G06F 9/5016 |
| 2004/0076044 A1* | 4/2004 | Nowshadi | ........... | G06F 12/0607 711/E12.079 |
| 2009/0240903 A1* | 9/2009 | Sauber | ................ | G06F 12/1009 711/206 |
| 2010/0325374 A1* | 12/2010 | Cypher | ............... | G06F 12/0646 711/170 |
| 2014/0047251 A1* | 2/2014 | Kottilingal | .............. | G06F 12/08 711/170 |

(Continued)

OTHER PUBLICATIONS

International Search Report and Written Opinion issued in App. No. PCT/US2023/037109, dated Feb. 7, 2024, 13 pages.

*Primary Examiner* — Volvick Derose
(74) *Attorney, Agent, or Firm* — Young Basile Hanlon & MacFarlane, P.C.

(57) ABSTRACT

Systems and methods are disclosed for dynamic power allocation for memory using multiple interleaving patterns. For example, a system may include a set of memory devices, including a first subset and a second subset, and a memory management circuitry configured to translate virtual addresses into physical addresses of memory locations in the set of memory devices using a first interleaving pattern when operating in a first mode; and translate virtual addresses using a second interleaving pattern when operating in a second mode. The first and second interleaving patterns both map virtual addresses in a first range exclusively to memory devices in the first subset. The first interleaving pattern maps virtual addresses in a second range to memory devices in the first subset and in the second subset. The second interleaving pattern maps virtual addresses in the second range exclusively to memory devices in the first subset.

20 Claims, 10 Drawing Sheets

(56) References Cited

U.S. PATENT DOCUMENTS

| | | | |
|---|---|---|---|
| 2015/0046732 A1* | 2/2015 | Chun | G06F 12/0607 |
| | | | 713/323 |
| 2015/0169041 A1* | 6/2015 | Blasco | G06F 1/3275 |
| | | | 713/320 |
| 2016/0124849 A1* | 5/2016 | Cho | G06F 3/0625 |
| | | | 711/157 |
| 2016/0321774 A1* | 11/2016 | Liang | G06T 11/40 |
| 2017/0108911 A1* | 4/2017 | Chun | G06F 12/10 |
| 2017/0108914 A1* | 4/2017 | Chun | G06F 12/0607 |
| 2017/0109090 A1* | 4/2017 | Chun | G06F 3/0625 |
| 2018/0225059 A1* | 8/2018 | Haas Costa | G06F 12/10 |
| 2019/0171580 A1* | 6/2019 | Suryanarayana | G06F 12/0238 |
| 2019/0213140 A1* | 7/2019 | Cooray | G06F 12/1009 |
| 2019/0306005 A1* | 10/2019 | Desai | G06F 13/1684 |
| 2021/0081324 A1* | 3/2021 | Bradshaw | G06F 12/1027 |
| 2022/0342806 A1* | 10/2022 | Fishwick | G06F 12/1072 |
| 2023/0097344 A1* | 3/2023 | Greathouse | G06F 3/064 |
| | | | 711/154 |
| 2023/0359550 A1* | 11/2023 | Muthiah | G06F 3/0659 |
| 2024/0004562 A1* | 1/2024 | Fowler | G06F 3/0631 |
| 2024/0152281 A1* | 5/2024 | Zhuo | G06F 12/0607 |

\* cited by examiner

DYNAMIC POWER ALLOCATION FOR MEMORY USING MULTIPLE INTERLEAVING PATTERNS

TECHNICAL FIELD

This disclosure relates to dynamic power allocation for memory using multiple interleaving patterns.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. Digital cameras may use large amounts of volatile memory to facilitate image processing for image capture. The volatile memory can consume a significant portion of the power budget for a camera. Power budget for a camera can affect battery life for the camera between charges.

SUMMARY

Disclosed herein are implementations of dynamic power allocation for memory using multiple interleaving patterns.

In a first aspect, the subject matter described in this specification can be embodied in systems that include a set of memory devices, including a first subset of one or more memory devices and a second subset of one or more memory devices that is disjoint from the first subset; and a memory management circuitry configured to: translate virtual addresses into physical addresses of memory locations in the set of memory devices using a first interleaving pattern when operating in a first mode; and translate virtual addresses using a second interleaving pattern when operating in a second mode. The first interleaving pattern and the second interleaving pattern both map virtual addresses in a first range exclusively to memory devices in the first subset. The first interleaving pattern maps virtual addresses in a second range to memory devices in the first subset and in the second subset. The second interleaving pattern maps virtual addresses in the second range exclusively to memory devices in the first subset.

In the first aspect, the system may include a power conservation circuitry configured to power down memory devices in the second subset while the memory management circuitry is operating in the second mode. In the first aspect, the power conservation circuitry may power down the memory devices in the second subset by changing a voltage on an enable conductor of the memory devices in the second subset. In the first aspect, the power conservation circuitry may power down the memory devices in the second subset by gating a clock signal into the memory devices in the second subset. In the first aspect, the memory management circuitry may be configured to dynamically change between the first mode and the second mode without rebooting a processing apparatus running software stored in the set of memory devices. In the first aspect, the first interleaving pattern may map virtual addresses in a third range exclusively to memory devices in the second subset, and the second interleaving pattern may map virtual addresses in the third range to a memory fault. In the first aspect, the first interleaving pattern may map virtual addresses in a fourth range to memory devices in the first subset and in the second subset, and the second interleaving pattern may map virtual addresses in the fourth range to a memory fault. In the first aspect, the system may include a non-volatile memory storing software that is configured to store heap data at virtual addresses in the second range. In the first aspect, the system may include a non-volatile memory storing software that is configured to store operating system code at virtual addresses in the first range. In the first aspect, each memory device in the set of memory devices may be a memory bank that can be accessed in parallel with other memory banks in the set of memory devices. In the first aspect, a memory device in the set of memory devices may be a double data rate synchronous dynamic random access memory chip. In the first aspect, the memory management circuitry may be configured to, when operating in the second mode, return a memory fault for virtual addresses outside of the first range and the second range. In the first aspect, the first interleaving pattern may use a 512-byte page size with consecutive pages in virtual memory mapped to different memory devices of the set of memory devices.

In a second aspect, the subject matter described in this specification can be embodied in methods that include executing instructions of operating system software for a processing apparatus stored in one or more memory devices in a set of memory devices using a first interleaving pattern to map virtual addresses to physical addresses; invoking a change from a first mode to a second mode for the processing apparatus while continuing to execute the operating system software, wherein the processing apparatus uses the first interleaving pattern for virtual address translation when in the first mode and uses a second interleaving pattern for virtual address translation when in the second mode; and executing instructions of the operating system software using the second interleaving pattern, wherein the first interleaving pattern uses all memory devices in the set of memory devices and the second interleaving pattern uses less than all of the memory devices in the set of memory devices.

In the second aspect, the change from the first mode to the second mode may be completed without rebooting the processing apparatus. In the second aspect, the methods may include powering down a subset of the memory devices in the set of memory devices when in the second mode. In the second aspect, heap data may be stored in a first range of virtual addresses when the processing apparatus is in the first mode and heap data may be stored in a second range of virtual addresses that is smaller than the first range of virtual addresses when the processing apparatus is in the second mode. In the second aspect, heap data may be stored in all memory devices in the set of memory devices using the first interleaving pattern when the processing apparatus is in the first mode and heap data may be stored in less than all memory devices in the set of memory devices using the second interleaving pattern when the processing apparatus is in the second mode.

In a third aspect, the subject matter described in this specification can be embodied in a non-transitory computer-readable storage medium. The non-transitory computer-readable storage medium may include executable instructions that, when executed by a processor, cause the processor to store instructions of operating system software in a first range of virtual addresses; dynamically change a mode of a memory management circuitry while executing the instructions in the first range of virtual addresses to select between a first interleaving pattern and a second interleaving pattern implemented by the memory management circuitry for translating virtual addresses to physical addresses in a set of memory devices, wherein the first interleaving pattern and the second interleaving pattern are the same within the first range of virtual addresses and there are differences between the first interleaving pattern and the second interleaving pattern outside of the first range of virtual addresses; store heap data in a second range of virtual addresses when using the first interleaving pattern to utilize all memory devices in the set of memory devices for storing heap data; power down a memory device in the set of memory devices when using the second interleaving pattern; and store heap data in a third range of virtual addresses when using the second interleaving pattern, wherein the third range of virtual addresses is smaller than the second range of virtual addresses.

In the third aspect, the third range of virtual addresses may be a subset of the second range of virtual addresses.

In a fourth aspect, the subject matter described in this specification can be embodied in methods that include storing instructions of operating system software in a first range of virtual addresses; dynamically changing a mode of a memory management circuitry while executing the instructions in the first range of virtual addresses to select between a first interleaving pattern and a second interleaving pattern implemented by the memory management circuitry for translating virtual addresses to physical addresses in a set of memory devices, wherein the first interleaving pattern and the second interleaving pattern are the same within the first range of virtual addresses and there are differences between the first interleaving pattern and the second interleaving pattern outside of the first range of virtual addresses; storing heap data in a second range of virtual addresses when using the first interleaving pattern to utilize all memory devices in the set of memory devices for storing heap data; powering down a memory device in the set of memory devices when using the second interleaving pattern; and storing heap data in a third range of virtual addresses when using the second interleaving pattern, wherein the third range of virtual addresses is smaller than the second range of virtual addresses.

In the fourth aspect, the third range of virtual addresses may be a subset of the second range of virtual addresses.

In a fifth aspect, the subject matter described in this specification can be embodied in a non-transitory computer-readable storage medium. The non-transitory computer-readable storage medium may include executable instructions that, when executed by a processor, cause the processor to execute instructions of operating system software for a processing apparatus stored in one or more memory devices in a set of memory devices using a first interleaving pattern to map virtual addresses to physical addresses; invoke a change from a first mode to a second mode for the processing apparatus while continuing to execute the operating system software, wherein the processing apparatus uses the first interleaving pattern for virtual address translation when in the first mode and uses a second interleaving pattern for virtual address translation when in the second mode; and execute instructions of the operating system software using the second interleaving pattern, wherein the first interleaving pattern uses all memory devices in the set of memory devices and the second interleaving pattern uses less than all of the memory devices in the set of memory devices.

In the fifth aspect, the change from the first mode to the second mode may be completed without rebooting the processing apparatus. In the fifth aspect, the non-transitory computer-readable storage medium may include executable instructions that, when executed by a processor, cause the processor to power down a subset of the memory devices in the set of memory devices when in the second mode. In the fifth aspect, heap data may be stored in a first range of virtual addresses when the processing apparatus is in the first mode and heap data may be stored in a second range of virtual addresses that is smaller than the first range of virtual addresses when the processing apparatus is in the second mode. In the fifth aspect, heap data may be stored in all memory devices in the set of memory devices using the first interleaving pattern when the processing apparatus is in the first mode and heap data may be stored in less than all memory devices in the set of memory devices using the second interleaving pattern when the processing apparatus is in the second mode.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
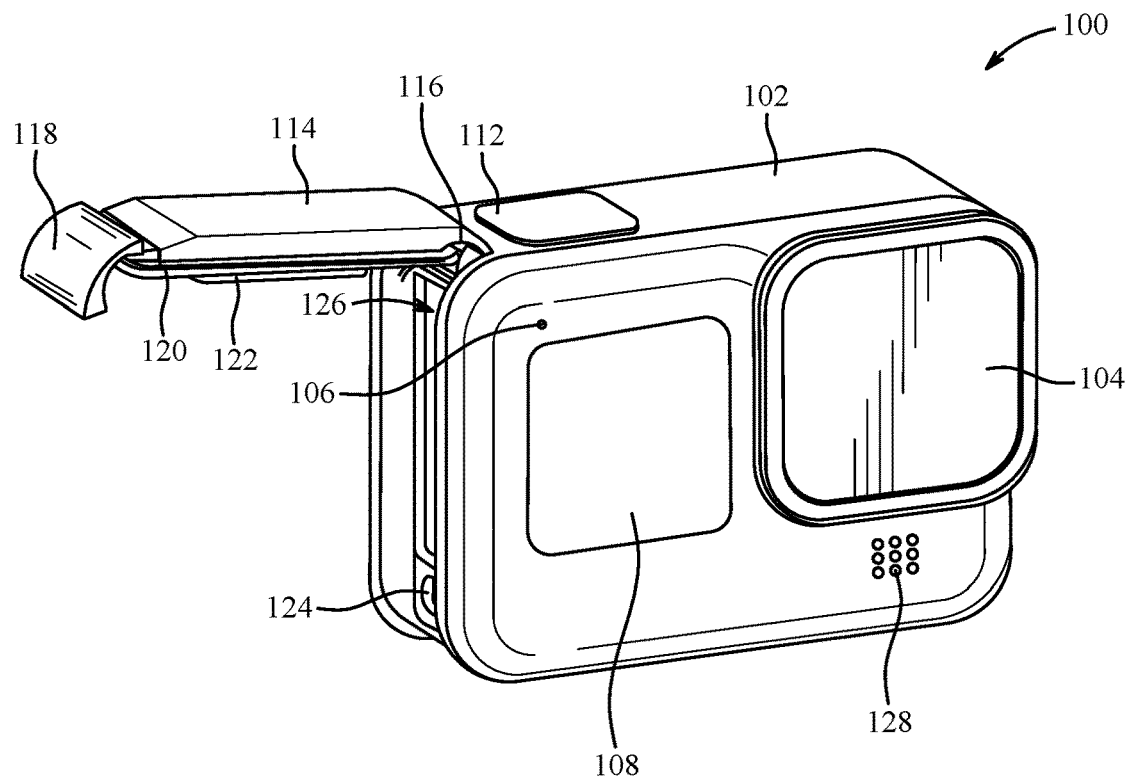
FIGS. 1A-B are isometric views of an example of an image capture device.

This document includes disclosure of systems, apparatus, and methods for dynamic power allocation for memory using multiple interleaving patterns. Power consumption is an important consideration in the design of image capture devices (e.g., cameras). Record time, battery life and capture at low temperature are key issues that may be impacted by a power consumption profile for an image capture device. Having multiple memory devices (e.g., double data rate synchronous dynamic random access memory (DDRs)) creates an opportunity to fine tune power consumption to different use cases by selectively powering down (e.g., turning off or disabling) a subset of the available memory devices when they are not need for a current use case. It is also preferable to be able to change the memory usage mode dynamically during use, without requiring a reboot of the image capture device that could cause delay and inconvenience to a user.

Some implementations described herein turn off a subset of available DDRs in the main system-on-a-chip (SOC) of a camera to save power while meeting the performance requirements of a current use case for the camera. For example, an image capture device with four DDRs running may consume 400 mW more than the same use case running with only two of the DDRs. There may be little for a user gain to by running with four DDRs compared to two, except that four DDRs may be required for some higher performance use cases and it may be complex to turn on/turn off a DDR. Some implementations use hardware and/or firmware to dynamically switch DDR(s) on and off according to use case needs.

Dynamically turning DDRs on and off may be enabled by organizing a memory map with DDR address interleaving in particular ways to facilitate seamless switching between modes and avoid reboot the device using the DDRs. For example, a memory management circuitry (e.g., a memory management unit (MMU) in the device may implement multiple interleaving patterns that can be selected based on the mode (e.g., performance mode or power conservation mode) to translate virtual addresses into physical addresses in the DDRs. The different interleaving patterns may have a common portion corresponding to a range of virtual addresses that can be used to store instructions (e.g., instructions of OS software) so that execution can continue seamlessly through mode transitions that turn a subset of the available DDRs on or off. The performance mode interleaving pattern may implement interleaving using all available DDRs in range of virtual addresses used for high heap data (e.g., pixel buffers) to increase memory bandwidth in the performance mode. Thus, from a software perspective, a change in mode may be experienced as simply a change in heap size and a change in memory bandwidth.

Image capture devices implementing these techniques for dynamic power allocation for memory may have advantages, such as, for example, reducing power consumption of the image capture device, while tailoring memory usage to the requirements of different use cases for memory capacity and memory bandwidth.

Figure 1B:
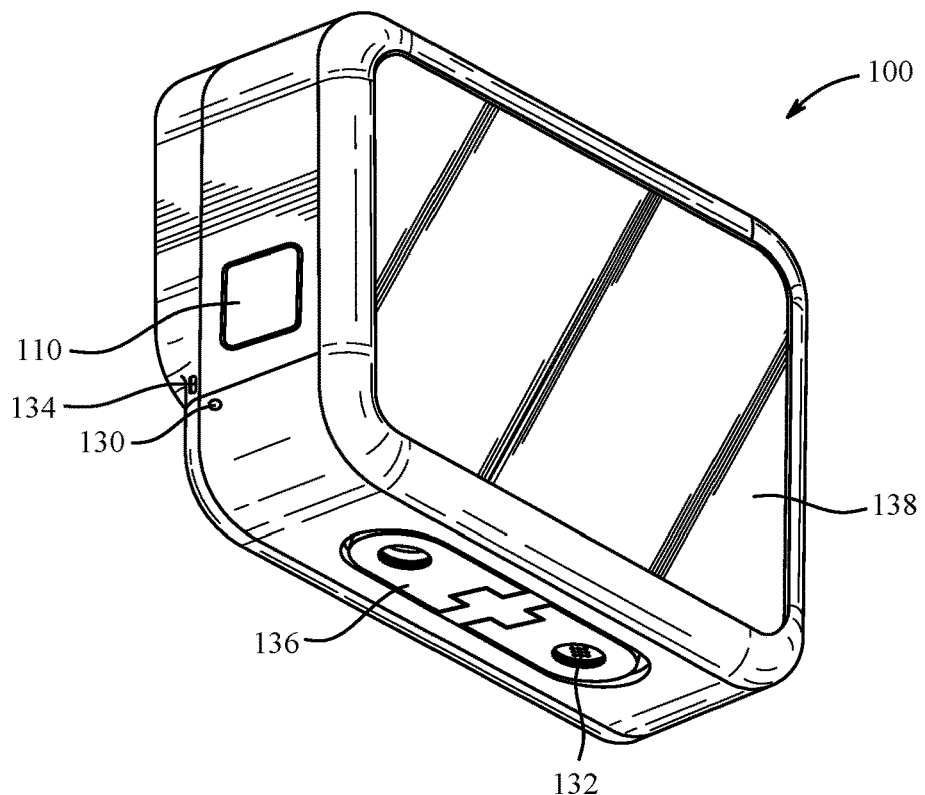

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 7:
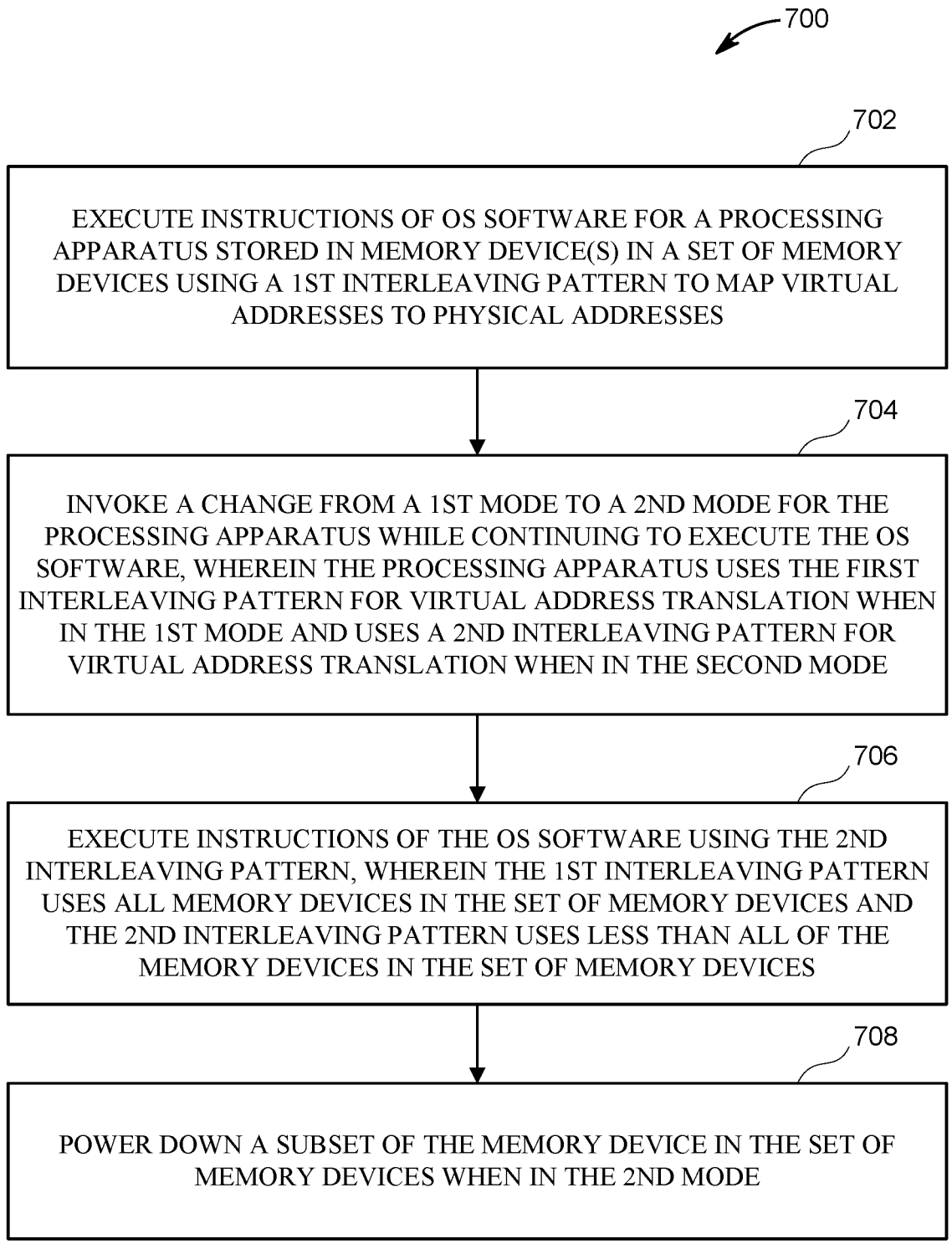
FIG. 7 is a flowchart of an example of a technique for dynamically switching between modes with different usage of a set of available memory devices.

The image capture device 100 may be used to implement some or all of the techniques described in this disclosure, such as the technique 700 described in FIG. 7.

Figure 2A:
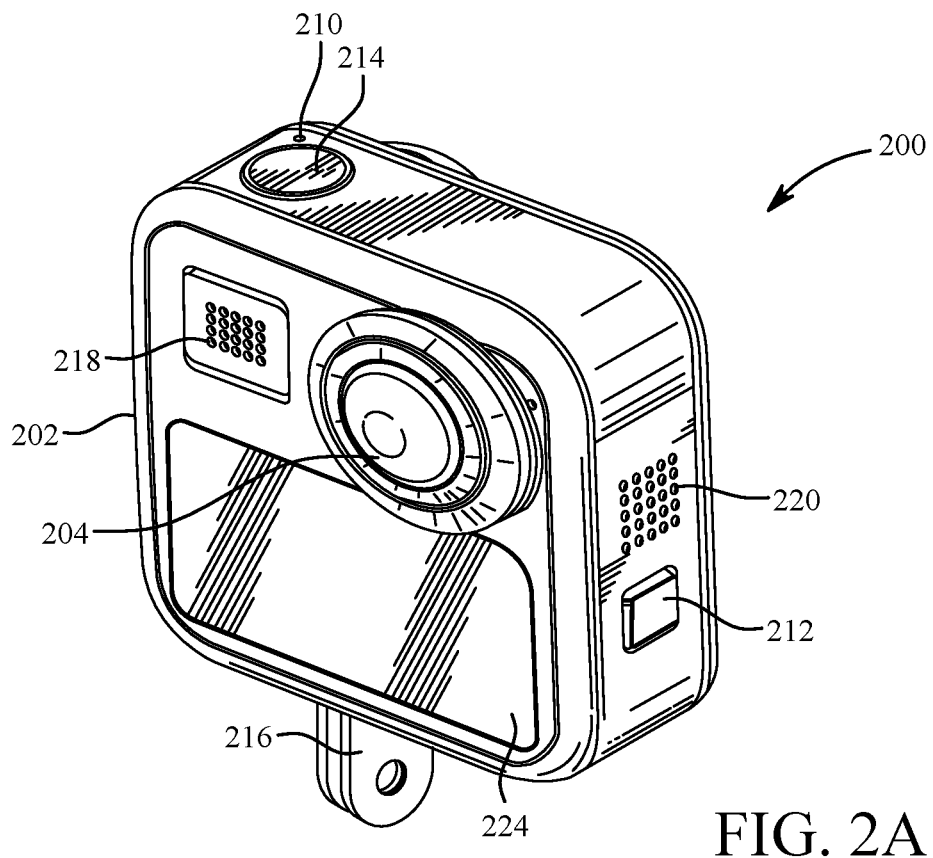
FIGS. 2A-B are isometric views of another example of an image capture device.
Figure 2B:
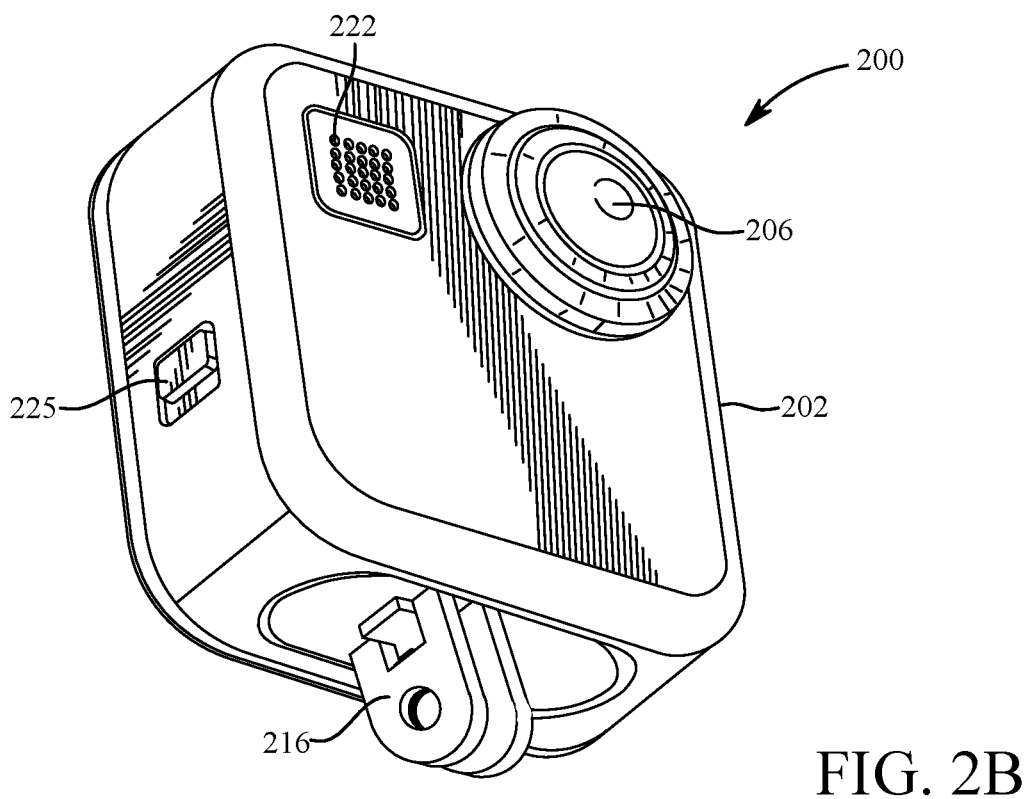

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
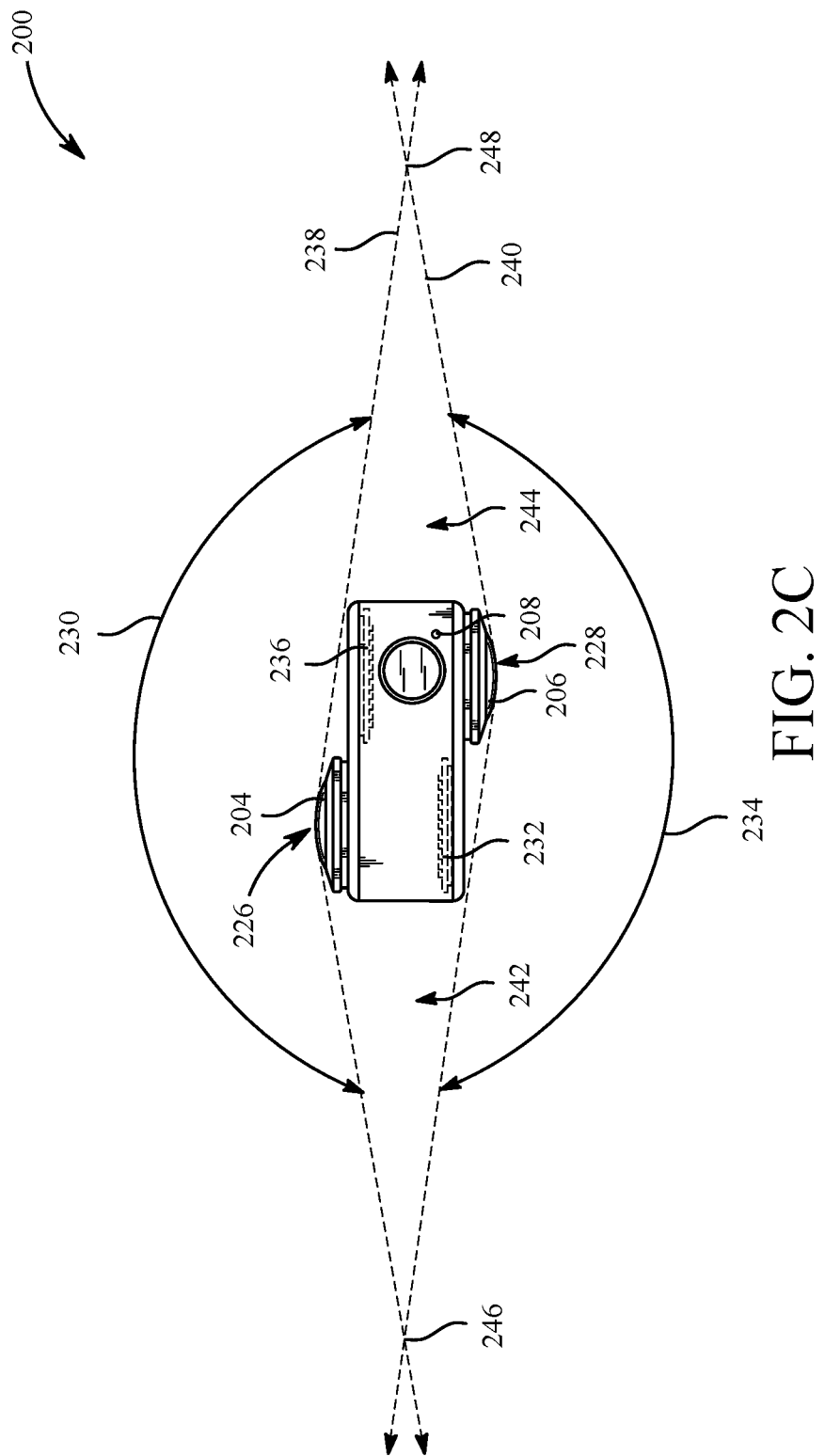
FIG. 2C is a top view of the image capture device of FIGS. 2A-B.
Figure 2D:
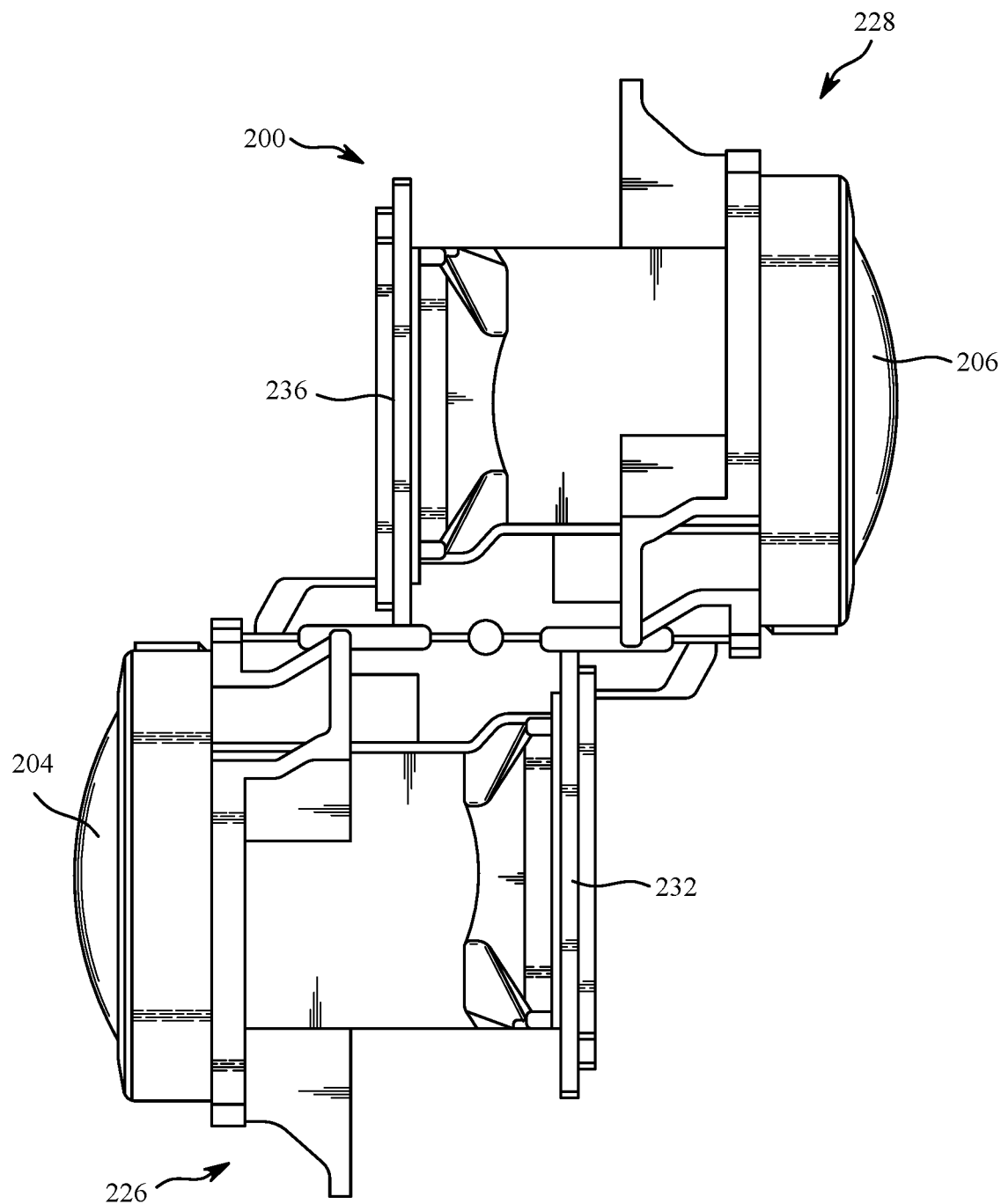
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the techniques described in this disclosure, such as the technique 700 described in FIG. 7.

Figure 3:
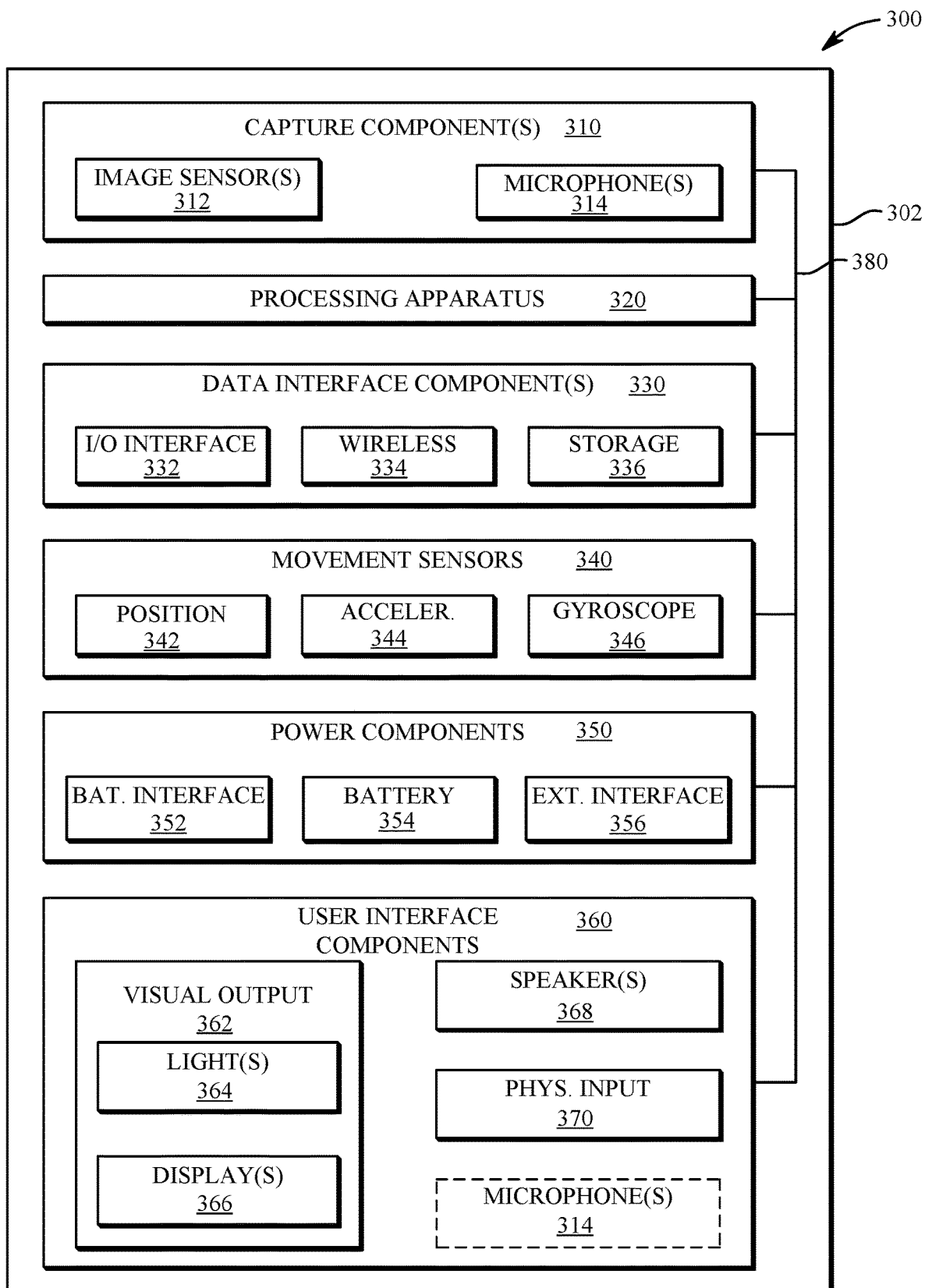
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300. For example, the processing apparatus 320 may include the processing apparatus 400 of FIG. 4.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation)

of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 8:
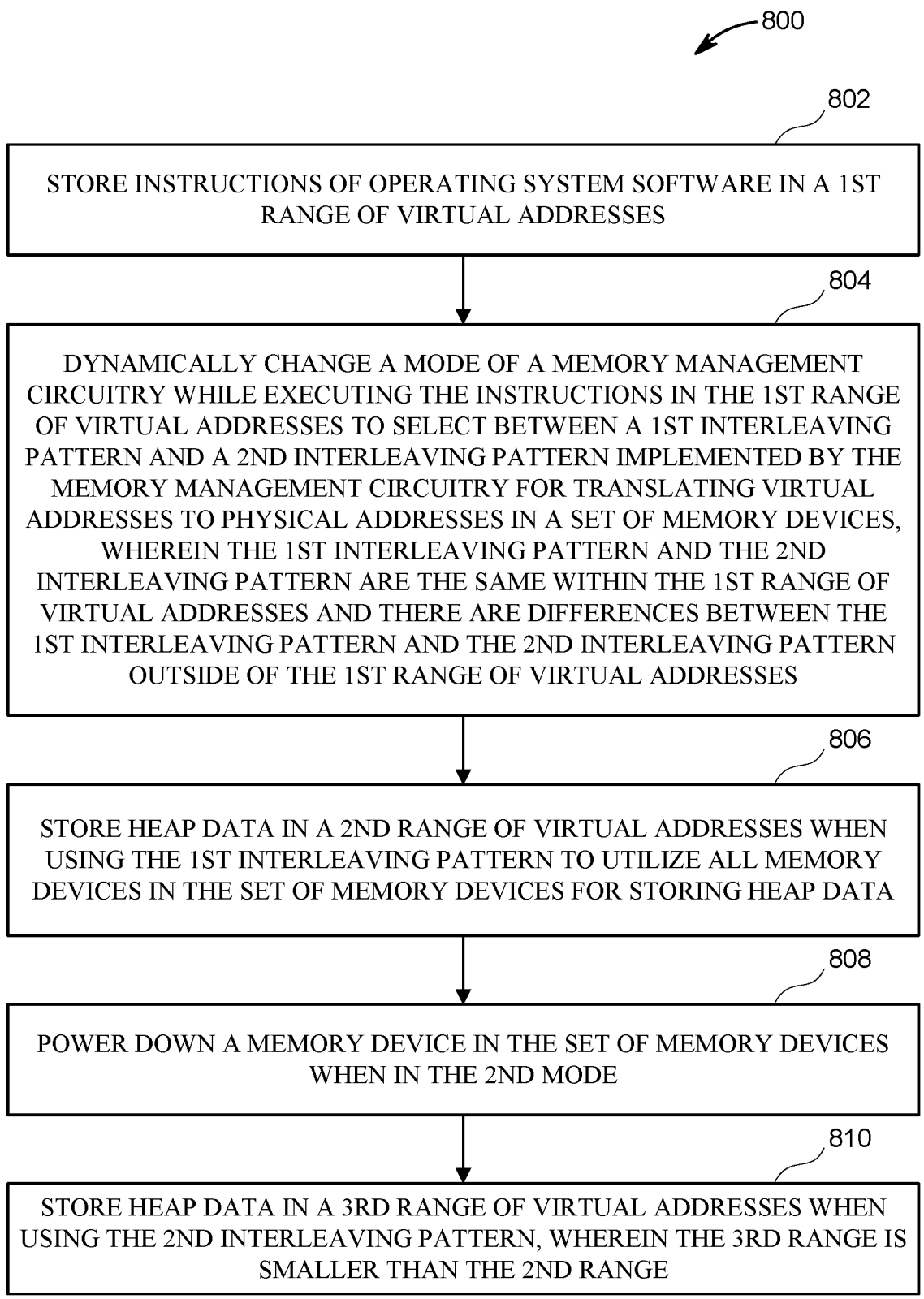
FIG. 8 is a flowchart of an example of a technique for dynamically running software in a low power mode by using less memory devices to store heap data by changing an interleaving pattern.

The image capture device 300 may be used to implement some or all of the techniques described in this disclosure, such as the technique 700 described in FIG. 7 or the technique 800 described in FIG. 8.

Figure 4:
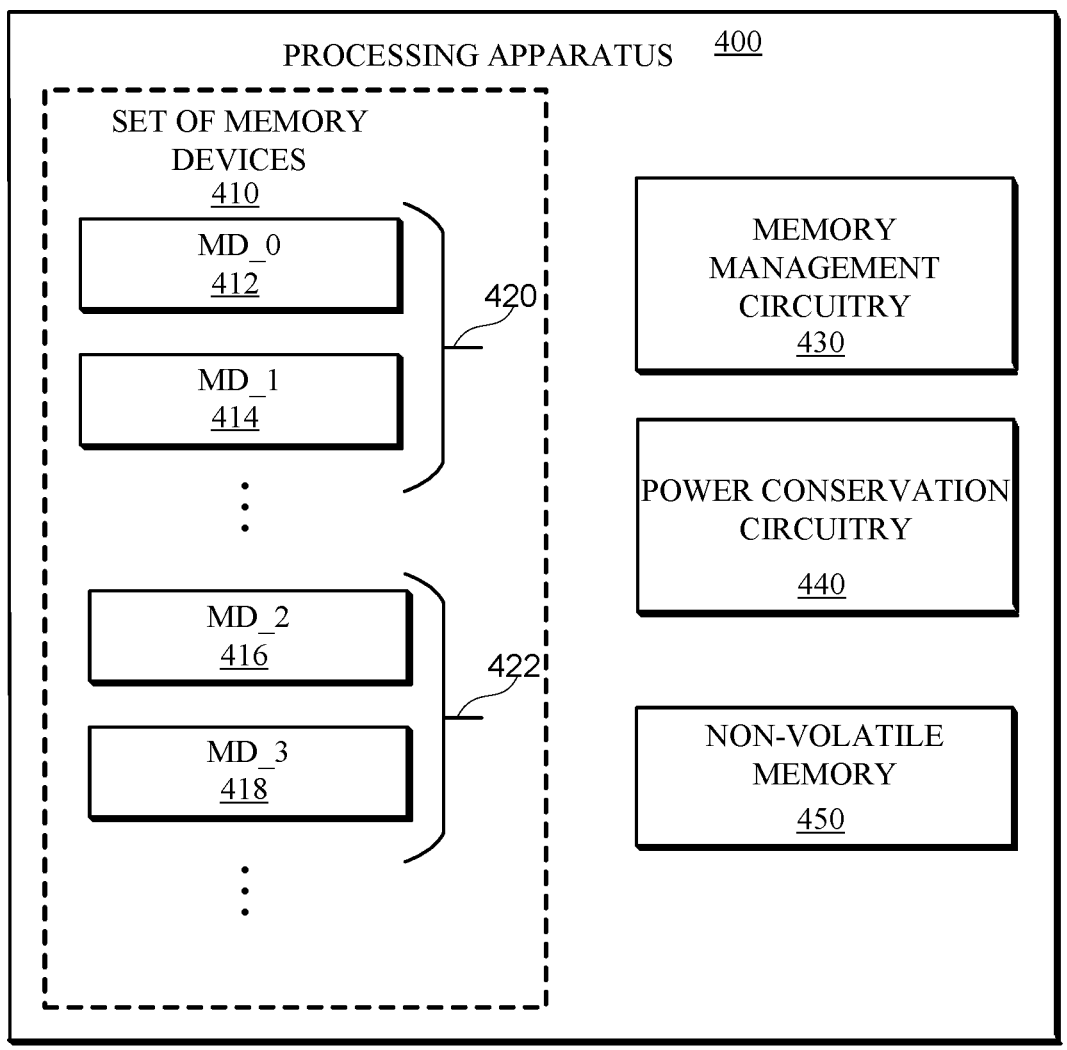
FIG. 4 is a block diagram of an example of a processing apparatus.

FIG. 4 is a block diagram of an example of a processing apparatus 400. The processing apparatus 400 includes a set of memory devices 410 and a memory management circuitry 430 configured to translate virtual addresses into physical addresses of memory locations in the set of memory devices 410. The processing apparatus 400 includes a power conservation circuitry 440 configured to selectively power down memory devices in the set of memory devices 410. The processing apparatus 400 includes a non-volatile memory 450 storing software that may be loaded into the set of memory devices 410 and executed by the processing apparatus 400. Although not explicitly shown in FIG. 1, the processing apparatus 400 may also include one or more processor cores that are configured to fetch and execute instructions from the set of memory devices 410 and to load data from and store data to the set of memory devices 410. For example, the processing apparatus 400 may be part of an image capture device (e.g., the image capture device 100) and may be used to capture images. For example, the processing apparatus 400 may be used to implement the technique 700 of FIG. 7. For example, the processing apparatus 400 may be used to implement the technique 800 of FIG. 8.

The processing apparatus 400 includes a set of memory devices 410, including a first subset 420 of one or more memory devices and a second subset 422 of one or more memory devices that is disjoint from the first subset. In this example, the first subset 420 includes a memory device 412 and a memory device 414, but the first subset 420 may include any positive number of memory devices. In this example, the second subset 422 includes a memory device 416 and a memory device 418, but the second subset 422 may include any positive number of memory devices. In some implementations, the set of memory devices 410 is partitioned into just the first subset 420 and the second subset 422. In some implementations, the set of memory devices 410 may be partitioned into more than two subsets, which may enable more levels of power conservation by selectively powering down one or more subsets of memory devices in the set of memory devices 410. In some implementations, each memory device in the set of memory devices 410 is a memory bank that can be accessed in parallel with other memory banks in the set of memory devices 410, which may enable interleaving patterns to be used to increase the speed at which data may be accessed in the set of memory devices 410. For example, a memory device (e.g., the memory device 412, the memory device 414, the memory device 416, and/or the memory device 418) in the set of memory devices 410 may be a double data rate synchronous dynamic random access memory chip (a DDR chip). In some implementations, a memory device (e.g., the memory device 412, the memory device 414, the memory device 416, and/or the memory device 418) in the set of memory devices 410 may be integrated in a system on a chip (SOC) with other components of the processing apparatus 400. In some implementations, a memory device (e.g., the memory device 412, the memory device 414, the memory device 416, and/or the memory device 418) in the set of memory devices 410 may be integrated with other components of the processing apparatus 400 in a package containing and connecting multiple integrated circuit chips (e.g., stacked in a Package on a Package (PoP) configuration). In some implementations, a memory device (e.g., the memory device 412, the memory device 414, the memory device 416, and/or the memory device 418) in the set of memory devices 410 may be discrete devices connected with other components of the processing apparatus 400 via conductors (e.g., traces on a printed circuit board (PCB) or a ribbon cable). For example, the set of memory devices 410 may be the set of memory devices 500 of FIG. 5.

The processing apparatus 400 includes a memory management circuitry 430 (e.g., a memory management unit (MMU)). The memory management circuitry 430 is configured to translate virtual addresses into physical addresses of memory locations in the set of memory devices 410 using a first interleaving pattern when operating in a first mode and translate virtual addresses using a second interleaving pattern when operating in a second mode. The first interleaving pattern and the second interleaving pattern both map virtual addresses in a first range exclusively to memory devices in the first subset 420. The first interleaving pattern maps virtual addresses in a second range to memory devices in the first subset 420 and in the second subset 422, which may increase memory bandwidth for access to data stored at virtual addresses in the second range by interleaving the data across more memory devices. The second interleaving pattern maps virtual addresses in the second range exclusively to memory devices in the first subset 420, which may enable memory devices in the second subset 422 to be powered down while in the second mode to reduce power consumption at the cost of reducing memory bandwidth for access to data stored at virtual addresses in the second range. For example, the memory management circuitry 430 may be configured to dynamically change between the first mode and the second mode without rebooting the processing apparatus 400 running software stored in the set of memory devices 410. For example, memory management circuitry 430 may dynamically change between the first mode and the second mode in response to a use case indication received for a device (e.g., the image capture device 100) including the processing apparatus 400. Some use cases may require more memory capacity and/or memory bandwidth than other use cases. Dynamic switching between the first mode and the second mode may enable optimization for power consumption by enable the selective powering down of memory devices in the set of memory devices 410. This dynamic changing between the first mode and the second mode may be enabled by the mapping of virtual addresses in the first range being unchanged between the first interleaving pattern and the second interleaving pattern, so that the first range may be used to store instructions for running software across transitions between the first mode and the second mode. Less memory may be available for use when in the second mode. For example, the memory management circuitry 430 may be configured to, when operating in the second mode, return a memory fault (e.g., return a bus error) for virtual addresses outside of the first range and the second range. In some implementations, the first interleaving pattern maps virtual addresses in a third range exclusively to memory devices in the second subset 422, and the second interleaving pattern maps virtual addresses in the third range to a memory fault. In some implementations, the first interleaving pattern maps virtual addresses in a fourth range to memory devices in the first subset 420 and in the second subset 422, and the second interleaving pattern maps virtual addresses in the fourth range to a memory fault. For example, the memory management circuitry 430 may be integrated with a processor core of the processing apparatus 400 (e.g., coupled with an L1 cache). The first interleaving pattern and the second interleaving pattern may be encoded in various ways by the memory management circuitry 430. For example, the first interleaving pattern and the second interleaving pattern may be encoded by alternative page tables stored by the processing apparatus 400. In some implementations, the first interleaving pattern uses a 512-byte page size with consecutive pages in virtual memory mapped to different memory devices of the set of memory devices 410. For example, the first interleaving pattern and the second interleaving pattern may be encoded by logic circuitry (e.g., gates) directly implementing the two address translation mappings. For example, the first interleaving pattern may be the interleaving pattern 600 of FIG. 6A. For example, the second interleaving pattern may be the interleaving pattern 650 of FIG. 6B.

The processing apparatus 400 includes a power conservation circuitry 440 configured to power down memory devices in the second subset 422 while the memory management circuitry is operating in the second mode. For example, the power conservation circuitry 440 may power down the memory devices in the second subset 422 by changing a voltage on an enable conductor of the memory devices in the second subset 422. For example, the power conservation circuitry 440 may power down the memory devices in the second subset 422 by gating a clock signal into the memory devices in the second subset 422. In some implementations, the power conservation circuitry 440 is integrated with the memory management circuitry 430. In some implementations, the power conservation circuitry 440 is separate from the memory management circuitry 430.

The processing apparatus 400 includes a non-volatile memory 450 storing software that is configured to store heap data at virtual addresses in the second range. In some implementations, the non-volatile memory 450 stores software that is configured to store operating system code at virtual addresses in the first range.

Figure 5:
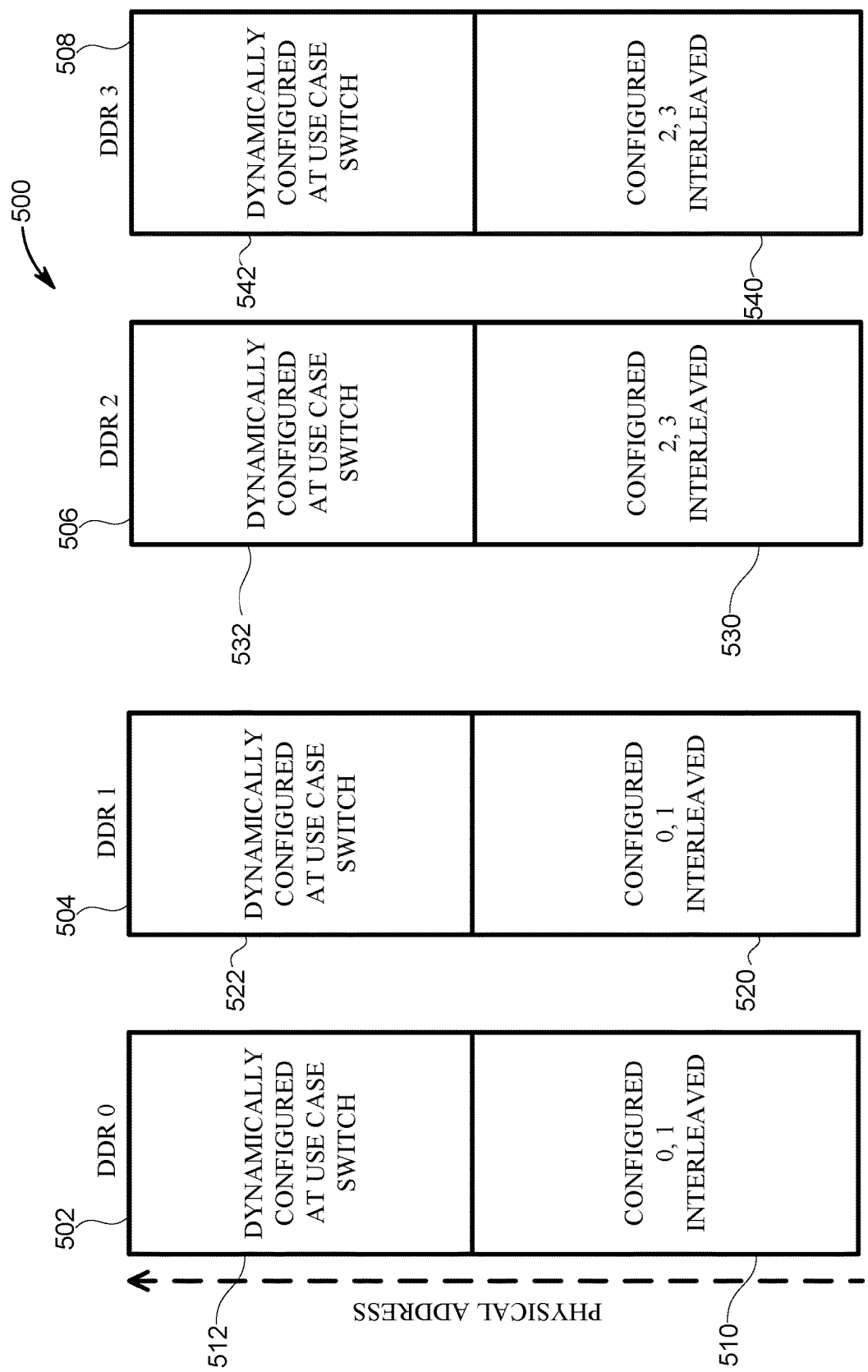
FIG. 5 is a block diagram of an example of a set of memory devices used by a processing apparatus.

FIG. 5 is a block diagram of an example of a set of memory devices 500 used by a processing apparatus. The set of memory devices 500 includes a first memory device 502 named DDR 0, a second memory device 504 named DDR 1, a third memory device 506 named DDR 2, and a fourth memory device 508 named DDR 3. The set of memory devices 500 may be partitioned into a first subset, including the first memory device 502 and the second memory device 504, and a second subset, including the third memory device 506 and the fourth memory device 508. The individual memory devices may themselves be partitioned into regions corresponding to different ranges of physical address in the memory device. Some of the regions of a memory device may be statically configured in the sense that a processing apparatus accessing them always maps physical addresses in statically configured regions to the same virtual addresses. Other regions of a memory device may be dynamically configured in the sense that a processing apparatus accessing them maps physical addresses in dynamically configured regions to different virtual addresses depending on a current mode selection. Note that the configuration of this address mapping may be implemented outside of the set of memory devices themselves, such as in a memory management circuitry (e.g., the memory management circuitry 430).

The first memory device 502 includes a first region 510 is that statically configured to be accessed using virtual addresses that are mapped to physical addresses using an interleaving pattern (e.g., the interleaving pattern 600 of FIG. 6A and the interleaving pattern 650 of FIG. 6B) in a range of virtual addresses that does not change between the available interleaving patterns used in different modes. The first memory device 502 includes a second region 512 is dynamically configured to be accessed using virtual addresses that are mapped to physical addresses using an interleaving pattern (e.g., the interleaving pattern 600 of FIG. 6A or the interleaving pattern 650 of FIG. 6B) in a range of virtual addresses that does change between the available interleaving patterns used in different modes. For example, the modes (e.g., a high-performance mode and a power conservation mode) that control how the second region 512 is addressed may be changed responsive to an indication of a use case change for device (e.g., the image capture device 100 or the image capture device 200) that includes the set of memory devices 500. Some use cases may require more memory capacity and/or memory bandwidth than other use cases.

Similarly, the second memory device 504 includes a first region 520 that is statically configured to be accessed using virtual addresses that are mapped to physical addresses using an interleaving pattern (e.g., the interleaving pattern 600 of FIG. 6A and the interleaving pattern 650 of FIG. 6B) in a range of virtual addresses that does not change between the available interleaving patterns used in different modes. The second memory device 504 includes a second region 522 is dynamically configured to be accessed using virtual addresses that are mapped to physical addresses using an interleaving pattern (e.g., the interleaving pattern 600 of FIG. 6A or the interleaving pattern 650 of FIG. 6B) in a range of virtual addresses that does change between the available interleaving patterns used in different modes. For example, the modes (e.g., a high-performance mode and a power conservation mode) that control how the second region 522 is addressed may be changed responsive to an indication of a use case change for device (e.g., the image capture device 100 or the image capture device 200) that includes the set of memory devices 500. The first memory device 502 and the second memory device 504 may constitute a first subset of the set of memory devices 500.

The third memory device 506 includes a first region 530 is that statically configured to be accessed using virtual addresses that are mapped to physical addresses using an interleaving pattern (e.g., the interleaving pattern 600 of FIG. 6A and the interleaving pattern 650 of FIG. 6B) in a range of virtual addresses that does not change between the available interleaving patterns used in different modes. The third memory device 506 includes a second region 532 is dynamically configured to be accessed using virtual addresses that are mapped to physical addresses using an interleaving pattern (e.g., the interleaving pattern 600 of FIG. 6A or the interleaving pattern 650 of FIG. 6B) in a range of virtual addresses that does change between the available interleaving patterns used in different modes. For example, the modes (e.g., a high-performance mode and a power conservation mode) that control how the second region 532 is addressed may be changed responsive to an indication of a use case change for device (e.g., the image capture device 100 or the image capture device 200) that includes the set of memory devices 500.

Similarly, the fourth memory device 508 includes a first region 540 that is statically configured to be accessed using virtual addresses that are mapped to physical addresses using an interleaving pattern (e.g., the interleaving pattern 600 of FIG. 6A and the interleaving pattern 650 of FIG. 6B) in a range of virtual addresses that does not change between the available interleaving patterns used in different modes. The fourth memory device 508 includes a second region 542 is dynamically configured to be accessed using virtual addresses that are mapped to physical addresses using an interleaving pattern (e.g., the interleaving pattern 600 of FIG. 6A or the interleaving pattern 650 of FIG. 6B) in a range of virtual addresses that does change between the available interleaving patterns used in different modes. For example, the modes (e.g., a high-performance mode and a power conservation mode) that control how the second region 542 is addressed may be changed responsive to an indication of a use case change for device (e.g., the image capture device 100 or the image capture device 200) that includes the set of memory devices 500. The third memory device 506 and the fourth memory device 508 may constitute a second subset of the set of memory devices 500.

In this example, the first region 510 of the first memory device 502 and the first region 520 of the second memory device 504 may be statically configured to correspond to virtual addresses in a first range of virtual address that are interleaved between the first memory device 502 and the second memory device 504. For example, consecutive 512-byte pages of memory in the first range of virtual addresses may alternate between being mapped to the first memory device 502 and the second memory device 504. Interleaving between only two of the four available memory devices in the set of memory devices 500 may limit the memory bandwidth that can be achieved when accessing data in the first range of virtual addresses. However, statically configuring these regions of the first subset of the set of memory devices 500 may enable instructions for software stored in this first range of virtual addresses to continue executing while the mode of the processing apparatus is dynamically changed without forcing a reboot.

In this example, the second region 512 of the first memory device 502, the second region 522 of the second memory device 504, second region 532 of the third memory device 506, and the second region 542 of the fourth memory device 508 may be dynamically configured to correspond to different virtual addresses in different modes. In a first mode (e.g., a high-performance mode) these regions may be accessed using a range of virtual addresses that are interleaved between all the memory devices (502, 504, 506, and 508) of the set of memory devices 500. For example, consecutive 512-byte pages of memory in this range of virtual addresses may cycle between being mapped to the first memory device 502, the second memory device 504, the third memory device 506, and the fourth memory device 508. For example, the virtual addresses in this range may be used by software to store heap data (e.g., high-heap data). Using all memory devices of the set of memory devices 500 in an interleaving pattern for addresses in this range of virtual addresses may increase the memory bandwidth achievable for accessing data (e.g., temporary image data being processed during image capture) stored in these regions. In a second mode (e.g., a power conservation mode) the second region 512 of the first memory device 502 and the second region 522 of the second memory device 504 may be accessed using a second range of virtual addresses that are interleaved between the first memory device 502 and the second memory device 504. For example, consecutive 512-byte pages of memory in the second range of virtual addresses may alternate between being mapped to the first memory device 502 and the second memory device 504. For example, the virtual addresses in this range may be used by software to store heap data. The second mode may enable the powering down of the third memory device 506 and the fourth memory device 508 to conserve power at the expense of reducing the memory bandwidth and capacity available to software for accessing heap data. In some implementations, the boundary between the first region (510, 520, 530, and/or 540) that is statically configured and the second region (512, 522, 532, and/or 542) that is statically configured for any of the memory devices in the set of memory devices 500 may be adjusted at boot time.

Figures 6A, 6B:
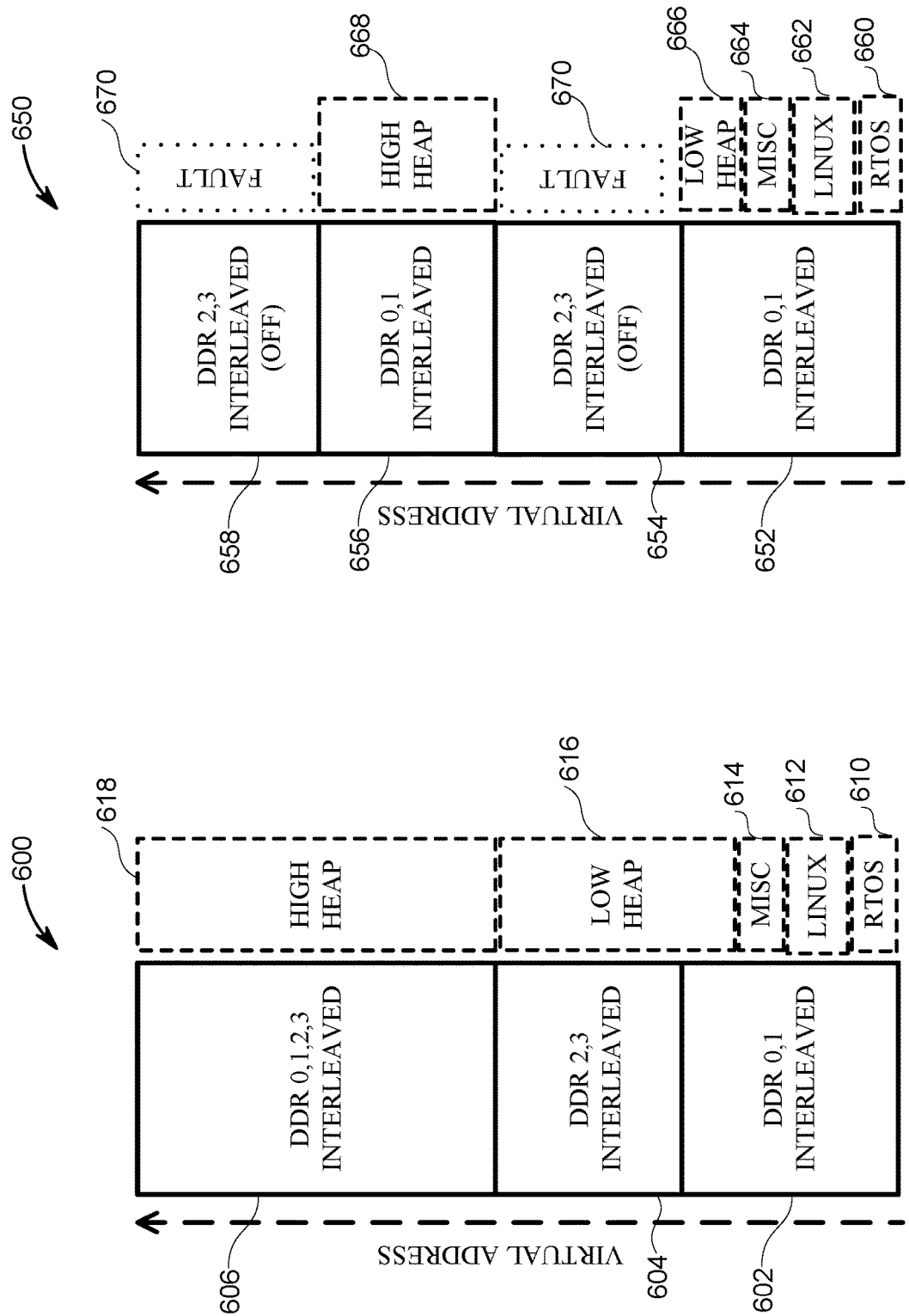
FIG. 6A is a memory map of an example of an interleaving pattern used to translate virtual addresses into physical addresses in multiple memory devices in a performance mode that uses all available memory devices to achieve high memory capacity and bandwidth.
FIG. 6B is a memory map of an example of an interleaving pattern used to translate virtual addresses into physical addresses in multiple memory devices in a low-power mode that uses a subset of available memory devices to conserve power consumption.

FIG. 6A is a memory map of an example of an interleaving pattern 600 used to translate virtual addresses into physical addresses in multiple memory devices in a performance mode that uses all available memory devices to achieve high memory capacity and bandwidth. The memory map has two columns arranged from bottom to top in virtual address order corresponding to different ranges of virtual addresses used by a processing apparatus. The left column describes features of the address translation mapping in a range of virtual addresses by identifying which memory device are included in an interleaving pattern applied in that range of addresses. The right column provides examples of data types that software may be configured to store in ranges of virtual addresses to effectively utilize the available memory in the performance mode.

The interleaving pattern 600 includes a first range 602 of virtual addresses that is interleaved using only two out of four available memory devices (502 and 504) in the set of memory devices 500. The interleaving pattern 600 includes a second range 604 of virtual addresses that is interleaved using the other two out of four available memory devices (506 and 508) in the set of memory devices 500. The interleaving pattern 600 includes a third range 606 of virtual addresses that is interleaved using all four available memory devices (502, 504, 506, and 508) in the set of memory devices 500. Using all available memory devices for interleaving in the third range 606 may enable high-bandwidth memory access to data stored in the third range 606 of virtual addresses. Using all available memory devices in the performance mode also increases the memory capacity available in the system. For example, where each memory device is configured to 1 gigabyte of data, the processing apparatus may make 4 gigabytes of memory available when running in the performance mode.

Software may be configured to store instructions, including instructions of operating system software for the processing apparatus in the first range 602 of virtual addresses. In this example, software is configured to store real-time operating system (RTOS) instructions 610 in the first range 602; store Linux operating system instructions 612 in the first range 602; store miscellaneous data and instructions 614 in the first range 602; store low heap data 616 in the first range 602 and in the second range 604; and store high heap data 618 in the third range 606 of virtual addresses. By storing the high heap data (e.g., including temporary image data being processed during image capture) in the third range, this data may be accessed with high memory bandwidth for high performance with low processing delays. For example, this high bandwidth memory access may enable the capture of high-resolution video in an image capture device (e.g., the image capture device 100 or the image capture device 200). For example, for high performance, pixel buffers may be stored in the high heap 618. For example, algorithms and libraries may be stored in the low heap 616.

FIG. 6B is a memory map of an example of an interleaving pattern 650 used to translate virtual addresses into physical addresses in multiple memory devices in a low-power mode that uses a subset of available memory devices to conserve power consumption. The memory map has two columns arranged from bottom to top in virtual address order corresponding to different ranges of virtual addresses used by a processing apparatus. The left column describes features of the address translation mapping in a range of virtual addresses by identifying which memory device are included in an interleaving pattern applied in that range of addresses. The right column provides examples of data types that software may be configured to store in ranges of virtual addresses to effectively utilize the available memory in the performance mode.

The interleaving pattern 650 includes a first range 652 of virtual addresses that is interleaved using only two out of four available memory devices (502 and 504) in the set of memory devices 500. The interleaving pattern 650 includes a second range 654 of virtual addresses that is interleaved using the other two out of four available memory devices (506 and 508) in the set of memory devices 500. The interleaving pattern 650 includes a third range 656 of virtual addresses that is interleaved using only two out of four available memory devices (502 and 504) in the set of memory devices 500. The interleaving pattern 650 includes a fourth range 658 of virtual addresses that is interleaved using the other two out of four available memory devices (506 and 508) in the set of memory devices 500. In this power conservation mode, two out of four available memory devices (506 and 508) in the set of memory devices 500 may be powered down (e.g., turned off or disabled) to conserve power consumption. Using only two of the four available memory devices in the power conservation mode may decrease the memory capacity available in the system. For example, where each memory device is configured to 1 gigabyte of data, the processing apparatus may make only 2 gigabytes of memory available when running in the power conservation mode. Using only two of the four available memory devices in the power conservation mode may also reduce the maximum achievable memory bandwidth.

Software may be configured to store instructions, including instructions of operating system software for the processing apparatus in the first range 652 of virtual addresses. The first range 652 is the same as the first range 602 in FIG. 6A and the interleaving pattern 650 in the first range 652 matches the interleaving pattern 600 in the first range 602. Having the two interleaving patterns (600 and 650) for these two modes of operation match in the first range (602/652) of virtual addresses may enable instructions for software to continue to be executed while a switch between the performance mode and the power conservation mode is occurring. In this manner, a reboot of the processing apparatus may be avoided when switching between the two modes.

In this example, software is configured to store real-time operating system (RTOS) instructions 660 in the first range 652; store Linux operating system instructions 662 in the first range 652; store miscellaneous data and instructions 664 in the first range 652; store low heap data 666 in the first range 652; and store high heap data 668 in the third range 656 of virtual addresses. Software may be configured to store nothing in the second range 654 and the fourth range 658 when running in the power conservation mode so that the third memory device 506 and the fourth memory device 508 may be powered down to reduce power consumption. For example, the processing apparatus may be configured to return a memory fault 670 (e.g., return a bus error) in response to any errant request from software to access addresses in the second range 654 and the fourth range 658 when running in the power conservation mode.

A transition from performance mode to power conservation mode or vice versa may be transparent from a firmware point of view. In some implementations, a transition from performance mode to power conservation mode or vice versa only affects heap sizes. In some implementations, a transition from performance mode to power conservation mode or vice versa occurs in response to a camera mode switch (e.g., a change in the video capture resolution). For example, PHY retraining, when turning on one or more memory devices (e.g., a DDR), may be fast (e.g., <100 ms). In some implementations, cold boot will run in performance mode in order to perform initial training of all memory devices in the set of memory devices 500. In some implementations, switch retraining only consists of temperature compensation.

FIG. 7 is a flowchart of an example of a technique 700 for dynamically switching between modes with different usage of a set of available memory devices. The technique 700 includes executing 702 instructions of operating system software for a processing apparatus stored in one or more memory devices in a set of memory devices using a first interleaving pattern to map virtual addresses to physical addresses; invoking 704 a change from a first mode to a second mode for the processing apparatus while continuing to execute the operating system software, the processing apparatus using the first interleaving pattern for virtual address translation when in the first mode and using a second interleaving pattern for virtual address translation when in the second mode; executing 706 instructions of the operating system software using the second interleaving pattern, the first interleaving pattern using all memory devices in the set of memory devices and the second interleaving pattern uses less than all of the memory devices in the set of memory devices; and powering down 708 a subset of the memory devices in the set of memory devices when in the second mode. For example, the technique 700 may be implemented using the image capture device 100 of FIGS. 1A-B. For example, the technique 700 may be implemented using the image capture device 200 of FIGS. 2A-C. For example, the technique 700 may be implemented using the image capture device 300 of FIG. 3. For example, the technique 700 may be implemented using the processing apparatus 400 of FIG. 4.

The technique 700 includes executing 702 instructions of operating system software for a processing apparatus stored in one or more memory devices in a set of memory devices (e.g., the set of memory devices 410) using a first interleaving pattern (e.g., the interleaving pattern 600 of FIG. 6A) to map virtual addresses to physical addresses. For example, the operating system software may be a real-time operating system (RTOS) software. For example, the operating system software may be a version of Linux. For example, a memory management circuitry (e.g., the memory management circuitry 430) may be used to implement the address translation according to the first interleaving pattern.

The technique 700 includes invoking 704 a change from a first mode (e.g., a high-performance mode) to a second mode (e.g., a power conservation mode) for the processing apparatus while continuing to execute the operating system software. The processing apparatus uses the first interleaving pattern for virtual address translation when in the first mode and uses a second interleaving pattern for virtual address translation when in the second mode. In some implementations, the change from the first mode to the second mode is completed without rebooting the processing apparatus. The address mapping for virtual addresses associated with the instructions of the operating system software may be the same for the first interleaving pattern and the second interleaving pattern, while the first interleaving pattern and the second interleaving pattern may differ for other ranges of virtual address to accommodate different use cases and power budgets. For example, heap data may be stored in a first range of virtual addresses when the processing apparatus is in the first mode and heap data is stored in a second range of virtual addresses that is smaller than the first range of virtual addresses when the processing apparatus is in the second mode. For example, the change between the first mode and the second mode may be invoked 704 in response to a use case indication received for a device (e.g., the image capture device 100) including the set of memory devices. Some use cases may require more memory capacity and/or memory bandwidth than other use cases. Dynamic switching between the first mode and the second mode may enable optimization for power consumption by enable the selective powering down of memory devices in the set of memory devices without incurring the delays associated with a reboot of the entire device.

The technique 700 includes executing 706 instructions of the operating system software using the second interleaving pattern. The first interleaving pattern uses all memory devices in the set of memory devices and the second interleaving pattern uses less than all of the memory devices in the set of memory devices. Using less memory for heap data in the second mode may enable a subset of the memory devices to be powered down 708 to conserve power consumption. Using less memory devices in the second mode may also reduce the maximum memory bandwidth (e.g., average speed of access) that can be achieved with memory interleaving strategies. For example, heap data may be stored in all memory devices in the set of memory devices using the first interleaving pattern when the processing apparatus is in the first mode and heap data is stored in less than all memory devices in the set of memory devices using the second interleaving pattern when the processing apparatus is in the second mode.

The technique 700 includes powering down 708 a subset of the memory devices in the set of memory devices when in the second mode. For example, powering down 708 a subset of the memory devices may include changing a voltage on an enable conductor of the memory devices in the subset. For example, powering down 708 a subset of the memory devices may include gating a clock signal into the memory devices in the subset.

FIG. 8 is a flowchart of an example of a technique 800 for dynamically running software in a low power mode by using less memory devices to store heap data by changing an interleaving pattern. The technique 800 includes storing 802 instructions of operating system software in a first range of virtual addresses; dynamically changing 804 a mode of a memory management circuitry while executing the instructions in the first range of virtual addresses to select between a first interleaving pattern and a second interleaving pattern implemented by the memory management circuitry for translating virtual addresses to physical addresses in a set of memory devices; storing 806 heap data in a second range of virtual addresses when using the first interleaving pattern to utilize all memory devices in the set of memory devices for storing heap data; powering down 808 a memory device in the set of memory devices when using the second interleaving pattern; and storing 810 heap data in a third range of virtual addresses when using the second interleaving pattern, where the third range of virtual addresses is smaller than the second range of virtual addresses. For example, the technique 800 may be implemented using the image capture device 100 of FIGS. 1A-B. For example, the technique 800 may be implemented using the image capture device 200 of FIGS. 2A-C. For example, the technique 800 may be implemented using the image capture device 300 of FIG. 3. For example, the technique 800 may be implemented using the processing apparatus 400 of FIG. 4.

The technique 800 includes storing 802 instructions of operating system software in a first range of virtual addresses (e.g., the first range 602). For example, the first range of virtual addresses may be reserved for program instructions. In some implementations, a boot routine in non-volatile memory of a processing apparatus may cause the transfer the instructions of operating system software from non-volatile memory to the set of memory devices at locations statically mapped to the first range of virtual addresses. The instructions of operating system software may then be fetched from the set of memory devices using virtual addresses in the first range to execute the operating system software and run a device including the processing apparatus (e.g., the image capture device 100).

The technique 800 includes dynamically changing 804 a mode of a memory management circuitry (e.g., the memory management circuitry 430) while executing the instructions in the first range of virtual addresses to select between a first interleaving pattern (e.g., the interleaving pattern 600 of FIG. 6A) and a second interleaving pattern (e.g., the interleaving pattern 650 of FIG. 6B) implemented by the memory management circuitry for translating virtual addresses to physical addresses in a set of memory devices. The first interleaving pattern and the second interleaving pattern are the same within the first range of virtual addresses (e.g., the first range 602) and there are differences between the first interleaving pattern and the second interleaving pattern outside of the first range of virtual addresses. The preservation of the mapping of addresses in the first range of virtual addresses between the first interleaving pattern and the second interleaving pattern may enable the instructions in the first range to continue to be executed without rebooting the processing apparatus. The differences between the first interleaving pattern and the second interleaving pattern outside of the first range may enable the processing apparatus to dynamically adapt memory usage in the processing apparatus to suit different use cases while conserving power or increasing memory capacity and memory bandwidth. For example, dynamically changing 804 a mode of a memory management circuitry may be triggered in response to a use case indication received for a device (e.g., the image capture device 100) including the set of memory devices. Some use cases may require more memory capacity and/or memory bandwidth than other use cases.

The technique 800 includes storing 806 heap data in a second range of virtual addresses (e.g., the third range 606) when using the first interleaving pattern to utilize all memory devices in the set of memory devices for storing heap data. By storing the heap data (e.g., including temporary image data being processed during image capture) in the second range, this data may be accessed with high memory bandwidth for high performance with low processing delays. For example, this high bandwidth memory access may enable the capture of high-resolution video in an image capture device (e.g., the image capture device 100 or the image capture device 200).

The technique 800 includes powering down 808 a memory device in the set of memory devices when using the second interleaving pattern. For example, powering down 808 the memory device may include changing a voltage on an enable conductor of the memory device. For example, powering down 808 the memory device may include gating a clock signal into the memory device.

The technique 800 includes storing 810 heap data in a third range of virtual addresses (e.g., the third range 656) when using the second interleaving pattern. The third range of virtual addresses is smaller than the second range of virtual addresses. In some implementations, the third range of virtual addresses is a subset of the second range of virtual addresses. For example, the third range of virtual addresses, despite limitations on memory capacity and bandwidth, may be sufficient to support operations of the device in a power conservation mode.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:
a set of memory devices, including a first subset of one or more memory devices and a second subset of one or more memory devices that is disjoint from the first subset; and
a memory management circuitry configured to:
translate virtual addresses into physical addresses of memory locations in the set of memory devices using a first interleaving pattern when operating in a first mode;
translate virtual addresses using a second interleaving pattern when operating in a second mode; and
power down a memory device in the set of memory devices when using the second interleaving pattern,
wherein the first interleaving pattern is a first memory map and the second interleaving pattern is a second memory map,
wherein the first interleaving pattern and the second interleaving pattern both map virtual addresses in a first range exclusively to memory devices in the first subset,
wherein the first interleaving pattern maps virtual addresses in a second range to memory devices in the first subset and in the second subset, and
wherein the second interleaving pattern maps virtual addresses in the second range exclusively to memory devices in the first subset.

2. The apparatus of claim 1, comprising:
a power conservation circuitry configured to power down memory devices in the second subset while the memory management circuitry is operating in the second mode.

3. The apparatus of claim 2, wherein the power conservation circuitry powers down the memory devices in the second subset by changing a voltage on an enable conductor of the memory devices in the second subset.

4. The apparatus of claim 2, wherein the power conservation circuitry powers down the memory devices in the second subset by gating a clock signal into the memory devices in the second subset.

5. The apparatus of claim 1, wherein the memory management circuitry is configured to dynamically change between the first mode and the second mode without rebooting a processing apparatus running software stored in the set of memory devices.

6. The apparatus of claim 1, wherein the first interleaving pattern maps virtual addresses in a third range exclusively to memory devices in the second subset, and the second interleaving pattern maps virtual addresses in the third range to a memory fault.

7. The apparatus of claim 6, wherein the first interleaving pattern maps virtual addresses in a fourth range to memory devices in the first subset and in the second subset, and the second interleaving pattern maps virtual addresses in the fourth range to a memory fault.

8. The apparatus of claim 1, further comprising:
a non-volatile memory storing software that is configured to store heap data at virtual addresses in the second range.

9. The apparatus of claim 1, further comprising:
a non-volatile memory storing software that is configured to store operating system code at virtual addresses in the first range.

10. The apparatus of claim 1, wherein each memory device in the set of memory devices is a memory bank that can be accessed in parallel with other memory banks in the set of memory devices.

11. The apparatus of claim 1, wherein a memory device in the set of memory devices is a double data rate synchronous dynamic random access memory chip.

12. The apparatus of claim 1, wherein the memory management circuitry is configured to, when operating in the second mode, return a memory fault for virtual addresses outside of the first range and the second range.

13. The apparatus of claim 1, wherein the first interleaving pattern uses a 512-byte page size with consecutive pages in virtual memory mapped to different memory devices of the set of memory devices.

14. A method comprising:
- executing instructions of operating system software for a processing apparatus stored in one or more memory devices in a set of memory devices using a first interleaving pattern to map virtual addresses to physical addresses;
- invoking a change from a first mode to a second mode for the processing apparatus while continuing to execute the operating system software, wherein the processing apparatus uses the first interleaving pattern for virtual address translation when in the first mode and uses a second interleaving pattern for virtual address translation when in the second mode; and wherein the first interleaving pattern is a first memory map and the second interleaving pattern is a second memory map;
- powering down a memory device in the set of memory devices when using the second interleaving pattern; and
- executing instructions of the operating system software using the second interleaving pattern, wherein the first interleaving pattern uses all memory devices in the set of memory devices and the second interleaving pattern uses less than all of the memory devices in the set of memory devices.

15. The method of claim 14, wherein the change from the first mode to the second mode is completed without rebooting the processing apparatus.

16. The method of claim 14, further comprising:
- powering down a subset of the memory devices in the set of memory devices when in the second mode.

17. The method of claim 14, wherein heap data is stored in a first range of virtual addresses when the processing apparatus is in the first mode and heap data is stored in a second range of virtual addresses that is smaller than the first range of virtual addresses when the processing apparatus is in the second mode.

18. The method of claim 14, wherein heap data is stored in all memory devices in the set of memory devices using the first interleaving pattern when the processing apparatus is in the first mode and heap data is stored in less than all memory devices in the set of memory devices using the second interleaving pattern when the processing apparatus is in the second mode.

19. A non-transitory computer-readable storage medium that includes instructions that, when executed by a processor, facilitate performance of operations to:
- store instructions of operating system software in a first range of virtual addresses;
- dynamically change a mode of a memory management circuitry while executing the instructions in the first range of virtual addresses to select between a first interleaving pattern and a second interleaving pattern implemented by the memory management circuitry for translating virtual addresses to physical addresses in a set of memory devices, wherein the first interleaving pattern is a first memory map and the second interleaving pattern is a second memory map, and wherein the first interleaving pattern and the second interleaving pattern are the same within the first range of virtual addresses and there are differences between the first interleaving pattern and the second interleaving pattern outside of the first range of virtual addresses;
- store heap data in a second range of virtual addresses when using the first interleaving pattern to utilize all memory devices in the set of memory devices for storing heap data; and
- power down a memory device in the set of memory devices when using the second interleaving pattern; and
- store heap data in a third range of virtual addresses when using the second interleaving pattern, wherein the third range of virtual addresses is smaller than the second range of virtual addresses.

20. The non-transitory computer-readable storage medium of claim 19, wherein the third range of virtual addresses is a subset of the second range of virtual addresses.

* * * * *